United States Patent [19]

Piltz et al.

[11] Patent Number: 4,724,027
[45] Date of Patent: Feb. 9, 1988

[54] METHOD OF MANUFACTURING A BODY WRAPPED BY A METAL FOIL

[75] Inventors: Lars-Eric Piltz, Dalby; Bo Ullman, Åhus; Bengt Svärd, Lund; Zoltan Pollak, Arlöv, all of

[73] Assignee: AB Akerlund & Rausing, Sweden

[21] Appl. No.: 798,127

[22] Filed: Nov. 14, 1985

[30] Foreign Application Priority Data

Nov. 16, 1984 [SE] Sweden ............................. 8405745

[51] Int. Cl.⁴ ............................................. B29C 47/06
[52] U.S. Cl. ........................ 156/244.12; 156/244.13; 156/244.17; 156/244.27; 156/272.2; 156/275.7; 156/379.6; 156/380.1; 156/461; 156/466; 156/468; 156/475; 156/498; 156/500
[58] Field of Search .................... 156/213, 218, 244.12, 156/244.13, 244.14, 244.17, 272.2, 379.6, 379.8, 380.1, 392, 275.7, 428, 461, 466, 468, 475, 498, 500, 244.27; 264/209.3, 209.4

[56] References Cited

U.S. PATENT DOCUMENTS

| | | | |
|---|---|---|---|
| 2,912,043 | 11/1959 | Bargholtz et al. | 156/461 |
| 3,684,607 | 8/1972 | Morris et al. | 156/244.13 |
| 3,843,438 | 10/1974 | Gabriel | 156/244.13 |
| 4,261,777 | 4/1981 | Vetter et al. | 156/244.13 |
| 4,268,336 | 5/1981 | Piltz et al. | 156/244.13 |
| 4,594,124 | 6/1986 | Harano et al. | 156/468 |

*Primary Examiner*—Caleb Weston
*Attorney, Agent, or Firm*—Lerner, David, Littenberg, Krumholz & Mentlik

[57] ABSTRACT

A method for continuously manufacturing a thin wall tube of an extrudable material, preferably a polyolefine, having a wrapper of a metal foil.

A thin wall extrudate is discharged from an extruder and a web of a metal foil having an adhesive layer thereon is fed against the outside of the tube and brought to fully cover the envelope surface of the tube with said layer facing the tube.

Thereafter the tube is fed into an opening in a housing forming a pressure and temperature zone.

The lamination pressure for laminating the metal foil to the tube is made selfadjusting by adapting the temperature and/or the efficient opening diameter of said opening to the inherent deformation resistance of the tube.

17 Claims, 6 Drawing Figures

METHOD OF MANUFACTURING A BODY WRAPPED BY A METAL FOIL

FIELD OF THE INVENTION

The present invention relates to a method for manufacturing a hollow thin wall body wrapped by a metal foil and more precisely a continous manufacturing method where a thin wall tube shaped body is extruded in an extruder from an extrudable material and wrapped by said foil.

BACKGROUND OF THE INVENTION

There are previously known intermittent methods where a metal foil laminate is sealed or laminated by means of a two component glue to a tube body supported by a mandrel. In such applications there have been proposed also methods to laminate by heat supply as an alternative to the two component glue.

However, it has turned out to be impossible to use heat sealing for laminating products of the type mentioned when the procedure is not made discontinous and when a sealing pressure is not created by means of a mandrel.

The object of the present invention is to eliminate such shortcoming and offer a continous manufacturing method which is useful also in other applications than laminating by heat sealing.

Additionally, the manufacturing method proposed according to the invention is well compatible with established production where common type of continous extrusion methods are used for manufacturing of tube shaped bodies.

SUMMARY OF THE INVENTION

The invention provides a method for continously manufacturing a thin wall body of an extrudable material wrapped by a metal foil.

The method is characterized in that an extrudate having thin walls is discharged in tube shape from an extruder, that a web of a metal foil having a layer of an adhesive is fed against the external side of the tube and brought to fully cover the envelope surface with said layer facing the tube, that the coated metal foil is fed into an opening in a housing forming a pressure and temperature zone, and that the lamination pressure for laminating the metal foil to the pipe is made self-adjusting by adapting the temperature and/or the efficient opening diameter of said opening to the deformation resistance of the tube.

In one embodiment the inherent deformation resistance of the tube is increased by placing internally in the tube, in the housing, a device that defines a zone of an elevated inner pressure.

The pressure increasing device preferably is given a pair of axially adjustable, flexible sleeves defining said zone of an elevated internal pressure.

The ratio between the wall thickness of the tube and the circumference is selected in the interval 1/500–1/100, preferably of the order 1/300.

The opening in said housing preferably is made radially expandable from a nominal measure defined by the actual tube diameter.

In one preferred embodiment there is arranged a mandrel for preforming the metal foil or adapting the shape of the metal foil to the external side of the tube. Such mandrel is centred magnetically inside the tube in front of said opening.

In the preferred embodiment there is selected a heat activatable adhesive as said adhesive or binder, preferably a hotmelt based on a polyolefin.

The metal foil preferably is applied such that a longitudinal joint, with or without overlap, is obtained in the longitudinal direction of the tube.

The lamination of the metal foil, and the heat activatable adhesive layer thereon, to the tube shaped body preferably is achieved by using a high frequency welding technique. The lamination tool has electrically conducting loops at spaced intervals in the longitudinal direction of the tube and arranged for providing a high frequency magnetic field and thus heat activation of the hotmelt on the metal foil.

Preferably the loops are arranged with a decreasing distance from the metal foil seen in the feeding direction of the tube.

In order to accomplish an efficient in-line cooling and lubricating of the tube covered by the foil, cooling loops preferably are arranged for carrying a cooling fluid in the lamination tool.

The "hotmelt" that is used, preferably based on a polyolefin, in the preferred embodiment for lamination is selected such that it has a relatively narrow solidification interval, of the magnitude 1° to 10° C.

Preferably the lower temperature of such interval is relatively low, around 80° C.

The invention is exemplified in the accompanying drawings, where

DESCRIPTION OF A PREFERRED EMBODIMENT

Figure 1:
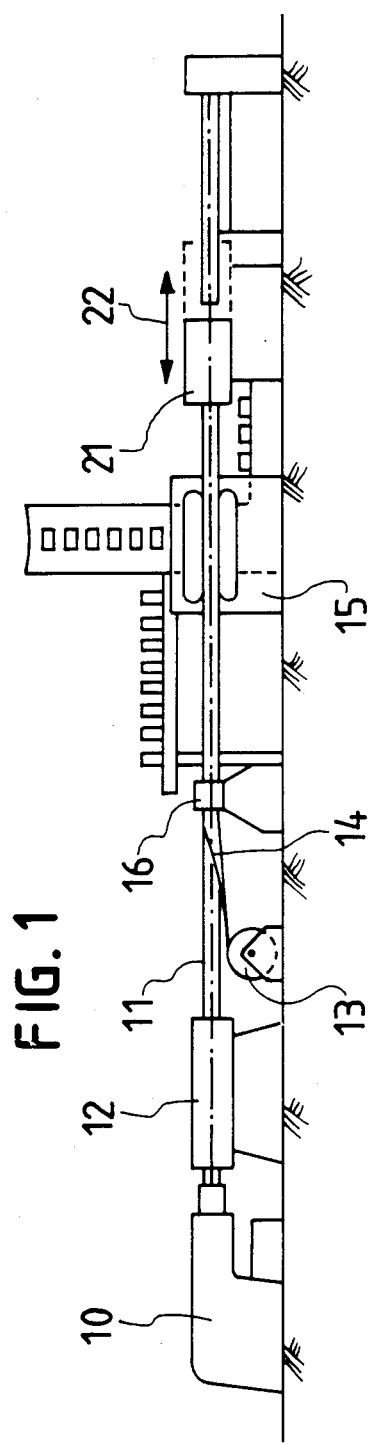
FIG. 1 in a block diagram shows a continously operating production line according to the invention.

By the reference numeral 10 there is shown an extruder for continuously manufacturing a tube shaped body 11 of an extrudable material, in the present case a polyolefin, preferably polypropylene. The tube shaped body is relatively thin and has a wall thickness typically in the interval about 0.4 to 1.0 mm. The diameter is around 70 to 100 mm. The ratio between the wall thickness of the tube and the circumference falls generally in the interval 1/500 to 1/100, preferably around 1/300.

A calibration unit 12 gives the tube shaped body 11 the nominal cross-section after having passed the unit 12.

From a supply roller 13 for a metal foil web having a layer of an adhesive, the web 14 is withdrawn at a speed substantially the same as the speed given the tube 11 by means of the pulling bench 15.

The mandrel 25 is placed inside the tube 11 by slotting this tube a suitable distance. An external magnetic support 26 supports magnets 27, 28, permanent magnets or electro magnets, and the radially inner poles 27a, 28a of such magnets cooperate with the magnet 29 of the mandrel. The magnetic force is distributed uniformly around the mandrel, implying that the mandrel is centred (journalled) magnetically inside the tube 11.

Figure 3:
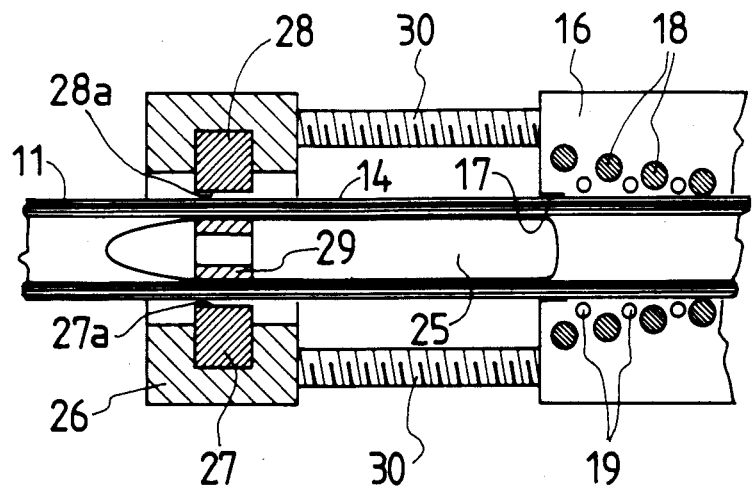
FIG. 3 is a schematic cross-section of the lamination tool, FIG. 4 schematically shows a spring supported arrangement of "hot-nip rings", FIG. 5 schematically shows a hot-nip having an elastic material, and FIG. 6 schematically shows a sleeve device for accomplishing an elevated internal pressure in a housing forming a "hot-nip".

As indicated in FIG. 3, the magnet support 26 is adjustable in the longitudinal direction by a bolt arrangement 30.

The metal foil web typically is an aluminium foil having a thickness in the interval 5 to 15 um. The side of the foil facing the tube has an adhesive layer. This layer is for instance of a heat activatable type and in the present case a hot/melt based preferably on a polyolefine and having a relatively narrow solidification interval, of the order of 1 to 10° C. The lower limit of such interval is selected as low as possible, preferably around 80° C.

The application of the foil in web form around tube 11 is obtained by a stationary guide (not shown) and a magnetically centred mandrel device 25. The foil is applied such that a longitudinal joint is obtained in the longitudinal direction of the tube. Such longitudinal joint may have or not have an overlap.

As soon as the foil 14 has been arranged for fully covering the tube 11, the tube and foil proceed into a lamination tool 16 forming a "hot-nip". Such tool has an opening 17 of a nominal cross-section adapted to the desired lamination pressure and the nominal cross-section of the tube 11. The operative cross-section of the opening 17 is self-adjusting, either by being suspended in rings 31 by springs 32 (FIG. 4) or by an insert of an elastic material 33 (FIG. 5) around the opening. This means that the lamination pressure for laminating the metal foil to the tube will be selfadjusting by adapting the efficient opening and thereby the pressure to the inherent deformation resistance of the tube.

By controlling the temperature of the extruded tube it is also possible to adjust the lamination pressure fully or partly. In this case it may be sufficient to have a fixed opening 17, i.e. without area variation.

Electrically conducting loops 18 are placed in a sealing tool and provide a high freuqency magnetic field for inducing heat in the metal foil and activation of the adhesive layer 14.

The loops 18 are placed with decreasing distance from the tube 11 seen in the transport direction. At the input end of the opening there is obtained a relatively low heating, and at the output end the heat supply is increased. Conduits 19 for a cooling and lubricating fluid, for instance water are arranged in the tool 16.

Figure 4:
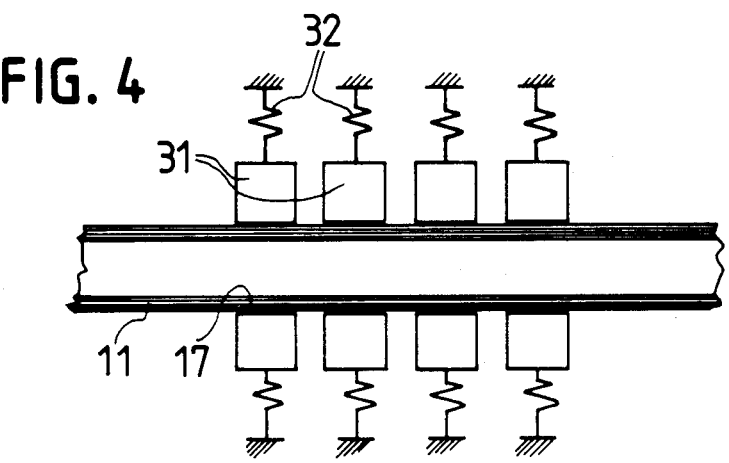
Figure 5:
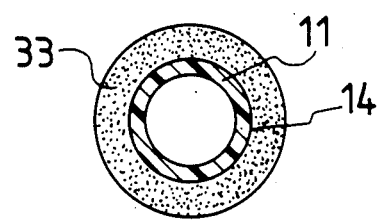
Figure 6:
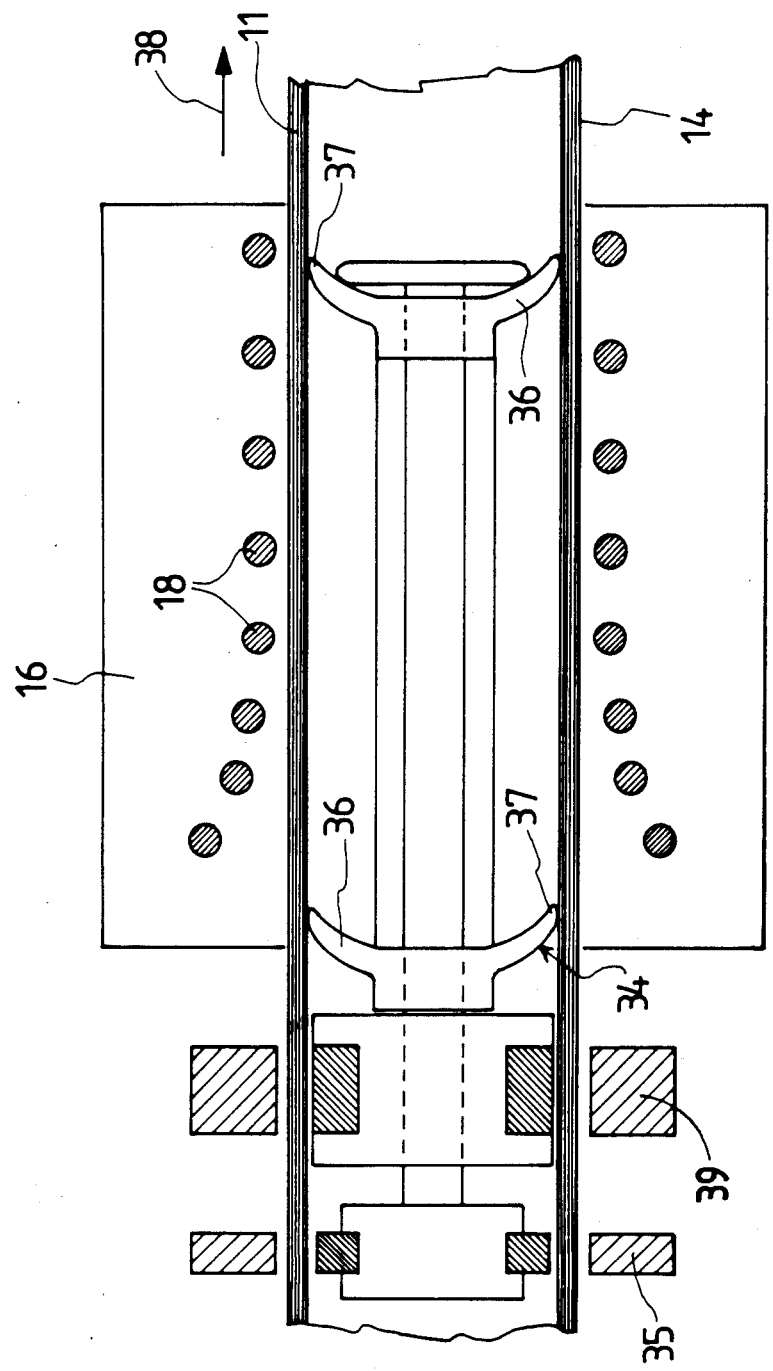

The device in FIG. 6 basically forms the same type of "hot-nip" as in FIGS. 4 and 5, and has a sleeve device 34. This device has a pair of flexible sealing elements which are axially displacable by an adjustment device 35. In such device 35 there may also be means for radially adjusting the pressure of the lips 37 against the inside of the tube. The device 35 is of a magnetically manouverable type which does not interfere with the pipe 11, 14 when such pipe is moved in the direction of the arrow 38.

A magnetic positioning device 39 guarantees that the sleeve device 34 is maintained in the correct position inside the housing 16.

The heating of the air inside the tube in the housing 16, due to the induction of an electric current in the metal foil, implies an elevated pressure in the area between the sealing elements 36, resulting in that the "hot-nip" senses something which would correspond to a tube having an increased inherent deformation resistance.

Figure 2:
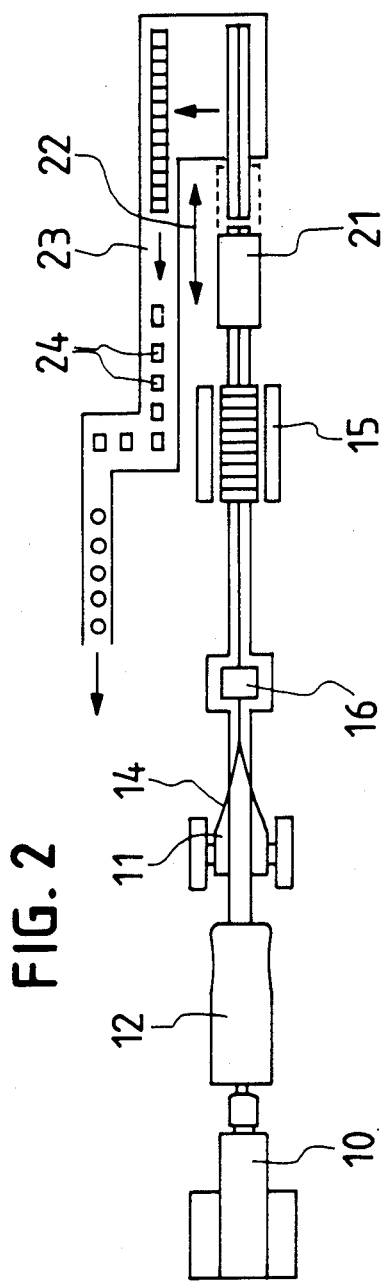
FIG. 2 shows the line in FIG. 1 seen from above.

In FIG. 2 there is shown how a "flying cutter" 21 moves in the direction of the double arrow 22 with a scheme of motion adapted to the actual continous production speed.

After the cutter 21 there is a distance 23 acting as a buffer for storing cut units 24 to be transported to a device (not shown) for sealing of bottoms to the cut sleeves.

Although specific embodiments of the invention have been described with reference to the drawings it is realized that alternatives and modifications are possible within the scope of the claims.

We claim:

1. A method for continuously manfacturing a hollow body laminated with a barrier material comprising the steps of:

extruding said hollow body in tubular form so as to form a tubular body having a predetermined deformation resistance, feeding a web of said barrier material against the external surface of said tubular body with an adhesive layer therebetween whereby said barrier material fully covers the surface of said tubular body, laminating said barrier material to said tubular body covered by said barrier material in a predetermined direction into an opening in a housing forming a pressure and temperature zone, whereby said tubular body covered by said barrier material is subjected to laminating pressures and temperatures therein, said opening in said housing having a predetermined diameter, adjusting said laminating pressures with respect to said predetermined deformation resistance of said tubular body by controlling said laminating temperatures, and creating a zone of elevated internal pressure within said housing by placing an internal device, including a pair of sleeves axially adjustable within said housing, within the interior of said tubular body so as to increase said predetermined deformation resistance of said tubular body.

2. The method of claim 1 wherein said feeding comprises applying said barrier material to said tubular body with a longitudinal joint extending in the longitudinal direction of said tubular body.

3. The method of claim 1 wherein said controlling of said laminating temperatures within said housing comprises providing a high frequency magnetic field within said housing so as to provide heat activation for said adhesive layer on said barrier material.

4. The method of claim 3 wherein said providing of said high frequency magnetic field comprises arranging electrically conductive loops at spaced intervals along said housing.

5. The method of claim 4 including spacing said electrically conductive loops decreasing distances from said tubular body measured transversely to said predetermined direction.

6. The method of claim 5 including cooling said tubular body within said housing by providing cooling loops for circulating a cooling fluid therein.

7. A method for continuously manufacturing a hollow body laminated with a barrier material comprising the steps of:

extruding said hollow body in tubular form so as to form a tubular body having a predetermined deformation resistance, feeding a web of said barrier material against the external surface of said tubular body with an adhesive layer therebetween whereby said barrier material fully covers the surface of said tubular body, adapting the shape of said barrier material to the outside surface of said tubular body in conjunction with said feeding of said barrier material against said external surface of said tubular body by providing a mandrel magnetically centered within said tubular body, laminating said barrier material to said tubular body by feeding said tubular body covered by said barrier material in a predetermined direction into an opening in a housing forming a pressure and temperature zone whereby said tubular body covered by said barrier material is subjected to laminating pressures and temperatures therein, said opening in said housing having a predetermined diameter, and adjusting said laminating pressures with respect to said predetermined deformation resistance of said tubular body by controlling the laminating temperatures within said housing.

8. A method for continuously manufacturing a hollow body laminated with a barrier material comprising the steps of:

extruding said hollow body in tubular form so as to form a tubular body having a predetermined deformation resistance, feeding a web of said barrier material against the external surface of said tubular body with an adhesive layer therebetween whereby said barrier material fully covers the surface of said tubular body, laminating said barrier material to said tubular body covered by said barrier material in a predetermined direction into an opening in a housing forming a pressure and temperature zone, whereby said tubular body covered by said barrier material is subjected to laminating pressures and temperatures therein, said opening in said housing having a predetermined diameter, adjusting said laminating pressures with respect to said predetermined deformation resistance of said tubular body by automatically adjusting said predetermined diameter of said opening in said housing, and creating a zone of elevated internal pressure within said housing by placing an internal device, including a pair of sleeves axially adjustable within said housing, within the interior of said tubular body so as to increase said predetermined deformation resistance of said tubular body.

9. A method for continuously manufacturing a hollow body laminated with a barrier material comprising the steps of:

extruding said hollow body in tubular form so as to form a tubular body having a predetermined deformation resistance, feeding a web of said barrier material against the external surface of said tubular body with an adhesive layer therebetween whereby said barrier material fully covers the surface of said tubular body, adapting the shape of said barrier material to the outside surface of said tubular body in conjunction with said feeding of said barrier material against said external surface of said tubular body by providing a mandrel magnetically centered within said tubular body, laminating said barrier material to said tubular body by feeding said tubular body covered by said barrier material in a predetermined direction into an opening in a housing forming a pressure and temperature zone whereby said tubular body covered by said barrier material is subjected to laminating pressures and temperatures therein, said opening in said housing having a predetermined diameter, and adjusting said laminating pressures with respect to said predetermined deformation resistance of said tubular body by automatically adjusting said predetermined diameter of said opening in said housing.

10. Apparatus for continuously manufacturing a hollow body laminated with a barrier material comprising:

extruding means for extruding said hollow body in tubular form so as to form a tubular body having a predetermined deformation resistance, web feeding mean for feeding a web of said barrier material against the external surface of said tubular body with an adhesive layer therebetween, whereby said barrier material fully covers the surface of said tubular body, a laminating housing including an entrance opening having a predetermined diameter, said laminating housing forming a pressure and temperature zone whereby said tubular body covered by said barrier material can be subjected to laminating pressures and temperatures therein, tubular body feeding means for feeding said tubular body covered by said barrier material into said laminating housing through said entrance opening in a predetermined direction, adjusting means for adjusting said laminating pressure with respect to said predetermined deformation resistance of said tubular body for laminating said barrier material to said tubular body, and internal pressure means located within said laminating housing for creating an elevated internal pressure within said tubular body whereby said predetermined deformation resistance of said tubular body is increased thereby, said internal pressure means comprising a pair of sleeve members axially adjustable within said tubular body.

11. Apparatus for continuously manufacturing a hollow body laminated with a barrier material comprising:

extruding means for extruding said hollow body in tubular form so as to form a tubular body having a predetermined deformation resistance, web feeding means for feeding a web of said barrier material against the external surface of said tubular body with an adhesive layer therebetween, whereby said barrier material fully covers the surface of said tubular body, mandrel means magnetically centered within said tubular body for adapting the shape of said barrier material to the outside surface of said tubular body in conjunction with said web feeding means, a laminating housing including an entrance opening having a predetermined diameter, said laminating housing forming a pressure and temperature zone whereby said tubular body covered by said barrier material can be subjected to laminating pressures and temperatures therein, tubular body feeding means for feeding said tubular body covered by said barrier material into said laminating housing through said entrance opening in a predetermined direction, and adjusting means for adjusting said laminating pressures with respect to said predetermined deformation resistance of said tubular body for laminating said barrier material to said tubular body.

12. Apparatus for continuously manufacturing a hollow body laminated with a barrier material comprising:

extruding means for extruding said hollow body in tubular form so as to form a tubular body having a predetermined deformation resistance, web feeding means for feeding a web of said barrier material against the external surface of said tubular body with an adhesive layer therebetween, whereby said barrier material fully covers the surface of said tubular body, a laminating housing including an entrance opening having a predetermined diameter, said laminating housing forming a pressure and temperature zone whereby said tubular body covered by said barrier material can be subjected to laminating pressures and temperatures therein, said entrance opening in said laminating housing including radial expansion means for rendering said entrance opening radially expandable from a nominal measure determined by the actual diameter of said tubular body, tubular body feeding means for feeding said tubular body covered by said barrier material into said laminating housing through said entrance opening in a predetermined direction, and adjusting means for adjusting said laminating pressure with respect to said predetermined deformation resistance of said tubular body for laminating said barrier material to said tubular body.

13. The apparaus of claim 12 wherein said adjusting means includes entrance opening control means for automatically adjusting said predetermined diameter of said entrance opening.

14. The apparatus of claim 12 wherein said adjusting means includes temperature control means for controlling said laminating temperatures.

15. The apparatus of claim 14 wherein said temperature control means comprises electrically conductive loops arranged at spaced intervals along said laminating housing for providing a high frequency magnetic field so as to provide heat activation for said adhesive on said barrier material.

16. The apparatus of claim 15 wherein said electrically conductive loops are spaced apart decreasing distances from said tubular body measured transversely to said predetermined direction.

17. The apparatus of claim 16 wherein said laminating housing also includes cooling loops for circulating a cooling fluid therein.

* * * * *